(12) United States Patent
Ballard, Jr. et al.

(10) Patent No.: US 6,853,956 B2
(45) Date of Patent: Feb. 8, 2005

(54) SOBRIETY TESTING APPARATUS HAVING OBD-II CONNECTION CAPABILITY

(75) Inventors: James Ralph Ballard, Jr., Coppell, TX (US); Thomas James Allison, Dallas, TX (US)

(73) Assignee: Smart Start Inc., Irving, TX (US)

( * ) Notice: Subject to any disclaimer, the term of this patent is extended or adjusted under 35 U.S.C. 154(b) by 0 days.

(21) Appl. No.: 10/364,101

(22) Filed: Feb. 11, 2003

(65) Prior Publication Data

US 2004/0158430 A1 Aug. 12, 2004

(51) Int. Cl.[7] .............................................. G06F 19/00
(52) U.S. Cl. ........................... 702/183; 701/1; 180/272; 180/287
(58) Field of Search ........................... 73/23.3; 180/272, 180/287; 340/425.5, 426.1, 426.11; 701/1; 702/183

(56) References Cited

U.S. PATENT DOCUMENTS

| | | |
|---|---|---|
| 3,831,707 A | 8/1974 | Takeuchi |
| 4,297,871 A | 11/1981 | Wright et al. |
| 4,314,564 A | 2/1982 | Albarda |
| 4,487,055 A | 12/1984 | Wolf |
| 4,592,443 A | 6/1986 | Simon |
| 4,697,666 A | 10/1987 | Collier et al. |
| 4,707,336 A | 11/1987 | Jones |
| 4,736,619 A | 4/1988 | Legrand |
| 4,770,026 A | 9/1988 | Wolf |
| 4,905,498 A | 3/1990 | O'Donnell et al. |
| 4,914,038 A | 4/1990 | Jewitt |
| 5,020,628 A | 6/1991 | Bigliardi et al. |
| 5,224,566 A * | 7/1993 | Stepanian et al. .......... 180/272 |

(List continued on next page.)

FOREIGN PATENT DOCUMENTS

| | | |
|---|---|---|
| WO | WO 98/16812 | 4/1998 |
| WO | WO 00/10458 | 3/2000 |

OTHER PUBLICATIONS

Godavarty et al., "Interfacing to the On–Board Diagnostic System", IEEE, 2000.*
OBD–2Automotive History and Information; Mar. 28, 2002; http://www.obd-2.com/hist.html.
EE Expert Matt LaDuke Automotive Electronics; Mar. 28, 2002; 2 pages; http://www.chipcenter.com/eexpert/mladuke/mladuke008.html.
On–Board Diagnostics (OBD)—Modification of Federal On–Board Diagnostic (OBD) Regulations; Nov. 1998; 19 pages; http://www.epa.gov/oms/obd.htm.
Details of the Instrumentation; Jul. 18, 2002; 5 pages; http://analytical.chem.wisc.edu/524Class/Folders/Miller/524topicc.html.
How Breathalyzers Work—Types of Devices; Jul. 18, 2002; 7 pages; http://www.howstuffworks.com/breathalyzer3.thm.

*Primary Examiner*—Patrick Assouad
(74) *Attorney, Agent, or Firm*—Thompson & Knight LLP; Richard L. Wynne, Jr.

(57) ABSTRACT

A sobriety interlock system having an alcohol detection device electrically connected to a computing device is provided. An electronic circuit is electrically connected between the computing device and an OBD-II port on a machine for receiving data related to operation of the machine. A breath sample is provided by an operator of the machine and the alcohol detection device determines the alcohol concentration of the breath sample. The computing device determines a blood alcohol concentration for the operator based on the breath alcohol concentration, and the computing device prevents or allows operation of the machine based on the level of the blood alcohol concentration. A memory device stores machine operation data received through the OBD-II port.

22 Claims, 4 Drawing Sheets

U.S. PATENT DOCUMENTS

| | | | |
|---|---|---|---|
| 5,303,575 A | 4/1994 | Brown et al. | |
| 5,361,771 A | 11/1994 | Craine et al. | |
| 5,426,415 A | 6/1995 | Prachar et al. | |
| 5,454,375 A | 10/1995 | Rothenberg | |
| 5,458,853 A | 10/1995 | Porter et al. | |
| 5,533,513 A | 7/1996 | Ueda et al. | |
| 5,573,005 A | 11/1996 | Ueda et al. | |
| 5,645,072 A | 7/1997 | Thrall et al. | |
| 5,797,134 A | 8/1998 | McMillan et al. | |
| 6,026,674 A | 2/2000 | Gammenthaler | |
| 6,050,953 A | 4/2000 | Warwick et al. | |
| 6,064,970 A | 5/2000 | McMillan et al. | |
| 6,075,444 A * | 6/2000 | Sohege et al. | 340/576 |
| 6,167,746 B1 | 1/2001 | Gammenthaler | |
| 6,229,908 B1 * | 5/2001 | Edmonds, III et al. | 382/124 |
| 6,430,488 B1 * | 8/2002 | Goldman et al. | 701/36 |
| 6,556,905 B1 * | 4/2003 | Mittelsteadt et al. | 701/35 |
| 6,697,732 B1 * | 2/2004 | Gotfried | 701/207 |
| 2002/0121981 A1 * | 9/2002 | Munch | 340/576 |
| 2002/0127145 A1 * | 9/2002 | Der Ghazarian et al. | 422/83 |
| 2003/0036823 A1 * | 2/2003 | Mahvi | 701/1 |
| 2003/0183437 A1 * | 10/2003 | Mendoza | 180/272 |

* cited by examiner

SOBRIETY TESTING APPARATUS HAVING OBD-II CONNECTION CAPABILITY

BACKGROUND OF THE INVENTION

1. Field of the Invention

This invention relates generally to devices and methods for determining the blood alcohol concentration of a person. More particularly, the invention relates to a device and method for determining the blood alcohol concentration of a machine operator prior to or during operation of the machine.

2. Description of Related Art

Various techniques have been employed for calculating a person's blood alcohol concentration by measuring breath samples. In a first method, the alcohol content in a breath sample is measured using a semiconductor sensor commonly referred to as a Taguchi cell. This method typically provides a low cost device, but instruments incorporating the Taguchi cell sometimes demonstrate poor accuracy.

A second method employs an infrared absorption technique for determining the blood alcohol concentration. This method has proven to have very high accuracy levels, but the sensor systems incorporating this technique are sometimes more expensive than other methods.

A third method employs a fuel cell together with an electronic circuit. The fuel cell method is described in U.S. Pat. No. 4,487,055, which is hereby incorporated by reference. Although this method typically provides more accuracy than the Taguchi cell, the systems comprising this method can be relatively expensive. One reason for the high cost associated with fuel cell techniques is that the method requires that a breath sample be of a determinable volume. Historically, this has been accomplished through the use positive displacement components such as piston-cylinder or diaphragm mechanisms. A more recent advance in the use of fuel cell sobriety devices is described in U.S. Pat. Nos. 6,026,674 and 6,167,746, which are hereby incorporated by reference. These devices provide an electronically controlled valve that selectively regulates the volume of air that passes through the fuel cell.

Sobriety detection systems have enjoyed increasing popularity in sobriety interlock systems for vehicles and other machinery. Sobriety interlock systems are wired into the ignition circuits of vehicles to prevent an operator from operating the vehicle while intoxicated. Until the operator can provide a breath sample that is either alcohol free or below a certain level, the sobriety interlock prevents operation of the vehicle. Some sobriety interlocks even attempt to log vehicle data such as vehicle speed, mileage, and time of operation. This data can be used to provide progress reports and evidentiary reports to authorities monitoring the activities of operators who have been criminally convicted of operating vehicles under the influence of alcohol.

The primary problem with existing sobriety interlock systems is the difficulty by which information is gathered from the vehicle to which the devices are attached. To obtain information about whether the engine of the vehicle is on, the interlock system must be connected directly to the ignition system. To determine the speed of the vehicle at any particular time, either a speed sensor must be installed, or the interlock device must be hard-wired to the vehicle's speedometer. Another circuit must be wired from the interlock system to a mileage sensor to determine how far the vehicle has traveled. This data as well as other data related to the operation of the vehicle is critical to the interlock system's logging function, however, the installation of individual circuits connected to the interlock system and sensors located throughout the vehicle makes comprehensive monitoring and logging of the vehicle's operating parameters difficult, if not impossible.

Another related problem with existing interlock systems is the difficulty in providing secure electrical connections between the interlock system and the vehicle. Electrical connections should preferably be secure and tamper-proof, so that data received by the interlock system cannot be altered or manipulated. Since multiple electrical connections are usually required with existing systems, each connection must be separately secured, thereby increasing the time and costs of installation.

A need exists, therefore, for a sobriety interlock device that is capable of quickly and efficiently obtaining operating parameters from a machine to which the sobriety interlock device is connected. A need also exists for a sobriety interlock device that is easy to install on the machine, and that requires a smaller number of separate electrical connections between the interlock system and the machine.

BRIEF SUMMARY OF THE INVENTION

The problems presented by existing sobriety interlock systems that attempt to gather machine operating data are solved by the present invention. A sobriety interlock system is provided that includes an alcohol detection device electrically connected to a computing device. An alcohol detection device is any device that is capable of determining the blood alcohol concentration of an operator of a machine, but is preferably an apparatus or technique for measuring the breath alcohol concentration of a breath sample from the operator. Suitable devices or techniques include fuel cells, Taguchi cells, infrared spectroscopy, gas chromatography, and chemical oxidation and photometry. An operator provides a breath sample, which is analyzed by the alcohol detection device. The computing device interprets signals received from the alcohol detection device to determine the blood alcohol concentration of the operator. The computing device prevents operation of the machine if the blood alcohol concentration of the operator is equal to or greater than a predetermined level and allows operation of the machine if the blood alcohol concentration of the operator is less than a predetermined level.

An electronic circuit is disposed between an on-board diagnostic port on the machine and the computing device. Machine operating parameters are obtained from the machine's on-board diagnostic system via the electronic circuit and are stored on a memory device associated with the computing device.

In one embodiment of the present invention, a method of gathering data related to the sobriety of an operator of a machine is provided. The breath of an operator is sampled by an alcohol detection device so that the alcohol concentration of the breath can be determined. The alcohol concentration is stored in a memory device. Machine operation data is received from an on-board diagnostic port on the machine and is also stored in the memory device.

Other objects, features, and advantages of the present invention will become apparent with reference to the drawings and detailed description that follow.

DETAILED DESCRIPTION OF THE PREFERRED EMBODIMENT

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
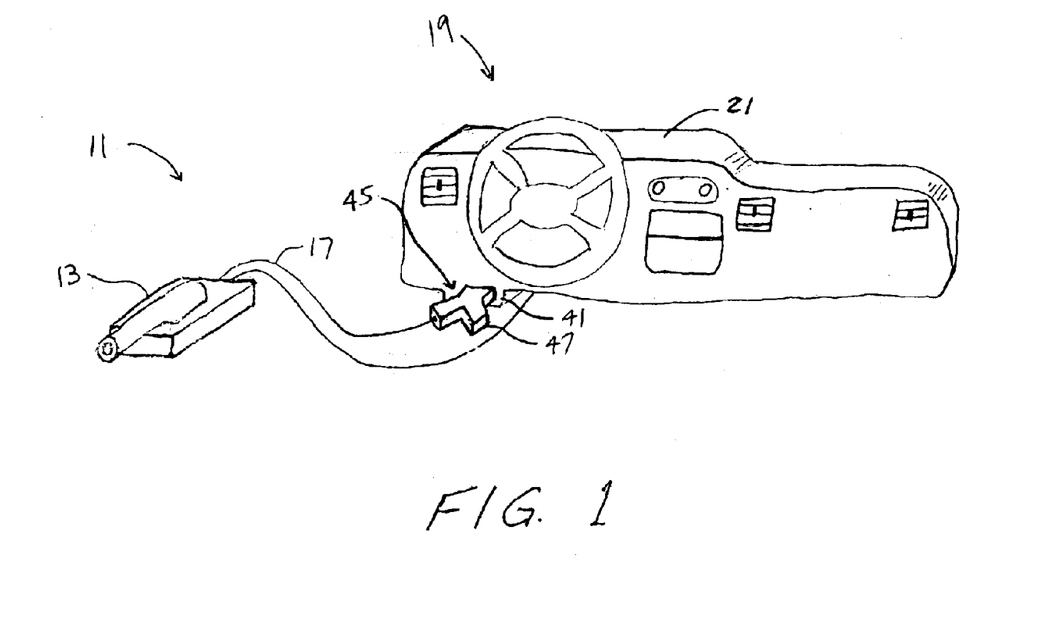
FIG. 1 illustrates a perspective view of a sobriety interlock system according to the present invention, the sobriety interlock system being connected to an on-board diagnostic port of a vehicle.
Figure 2:
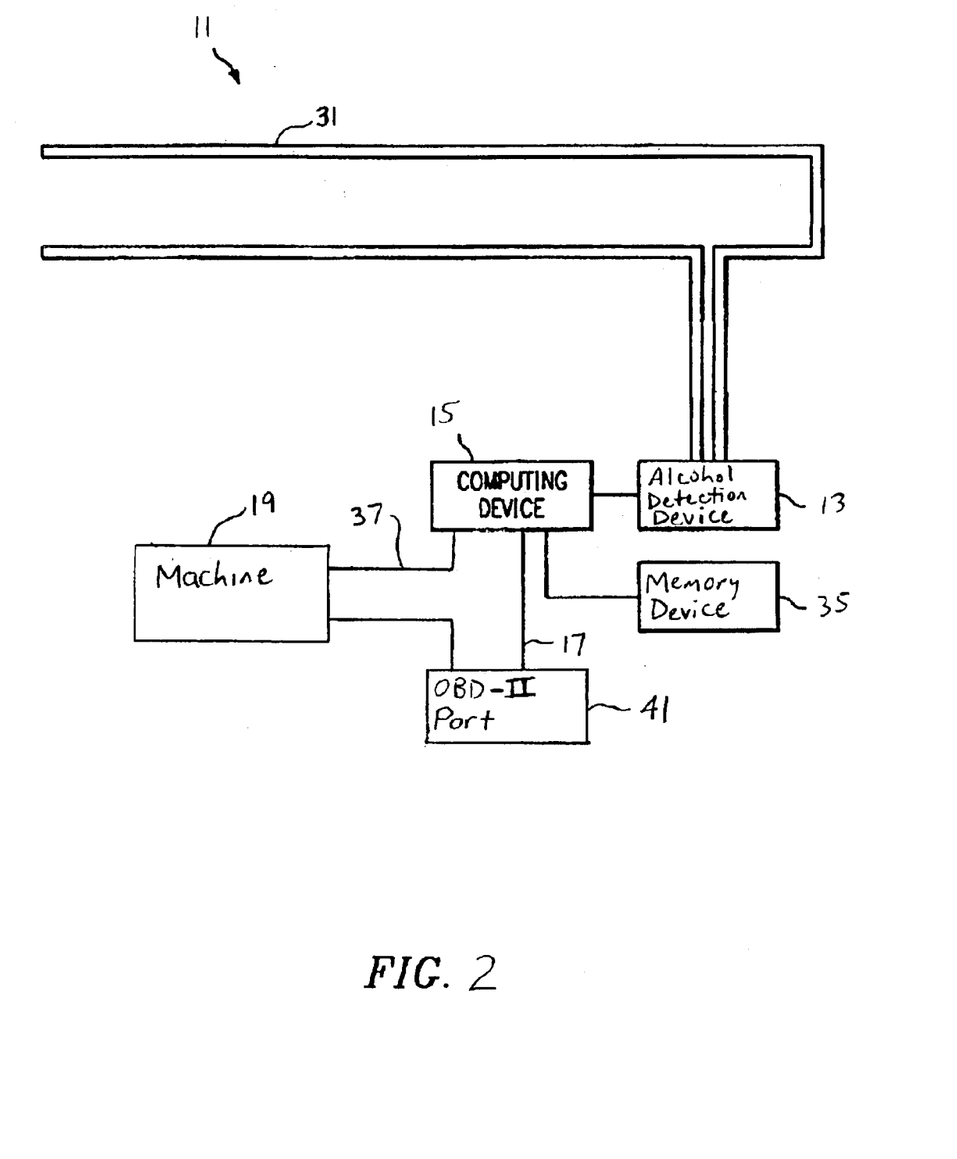
FIG. 2 depicts a schematic view of the sobriety interlock system of FIG. 1.

Referring to FIGS. 1 and 2 in the drawings, a sobriety interlock device 11 according to the present invention includes an alcohol detection device 13, a computing device 15, and an electronic circuit 17. Sobriety interlock device 11 is installed on a machine 19 to insure that the machine is not operated by inebriated operators. Typically, the machine 19 is an automobile, and a dashboard 21 of an automobile is shown in FIG. 1. Preferably, sobriety interlock device 11 is installed near a steering wheel 23 of the automobile, which is located on the operator's side of dashboard 21.

Alcohol detection device 13 assists in determining the concentration of alcohol in a person's blood (blood alcohol concentration). Although alcohol detection device could be any device for measuring the blood alcohol concentration of a person, typically the device functions by measuring the concentration of alcohol in a person's breath (breath alcohol concentration). As will be appreciated by those of ordinary skill in the art, the alcohol concentration of "deep-lung" air is approximately proportional to the person's blood alcohol concentration. By ultimately determining the person's blood alcohol concentration, it can be determined whether the person is fit to operate machine 19.

Referring still to FIG. 2, alcohol detection device 13 is typically fluidly connected to a breath induction tube 31 for receiving a breath sample from an operator of the machine 19. The breath sample is analyzed by the alcohol detection device 13, which could be any one of several devices for detecting the amount of alcohol in a gaseous sample. Suitable alcohol detection devices 13 or detection techniques include, without limitation, fuel cells, Taguchi cells, infrared spectroscopy, gas chromatography, and chemical oxidation and photometry.

Fuel cell technology is an increasingly common way of determining alcohol concentrations in breath samples. A fuel cell includes a first and second platinum electrode that are electrically connected, but physically separated by a porous material impregnated with an acidic electrolyte. As a breath sample passes over the first electrode, alcohol within the breath sample is oxidized, thereby producing protons that move to the second electrode through the porous, electrolytic material. Electrons are also produced, and the electrons flow along a circuit that travels from the first electrode to a current meter and back to the second electrode. The electrons traveling to the second electrode combine with the protons and oxygen to form water. The amount of current measured by the current meter is proportional to the amount of alcohol present in the breath sample.

Semiconductor sensors are also used as alcohol detection devices. The semiconductor sensor, sometime referred to as a Taguchi cell, includes a small bead of a transition metal oxide that is heated to a temperature of approximately 300° C. A voltage is applied across the bead to create a small, standing current. The resistivity of the oxide surface layer changes in the presence of organic chemicals such as alcohol. When alcohol is present, the standing current changes as a result of the change in resistivity. The concentration of the alcohol can be determined according to the magnitude of the current change.

Infrared spectroscopy identifies molecules based on the way the molecules absorb infrared light. The vibrations of molecules change when exposed to infrared light because of the bending and stretching of bonds within the molecule. Because each type of bond absorbs infrared light at different wavelengths, a particular molecule can be identified by determining which wavelengths are absorbed. Furthermore, the amount of the absorption indicates the amount of the particular molecule that is present. By measuring the infrared wavelengths and amounts of those wavelengths that are absorbed by a breath sample, the presence and amount of alcohol in the breath sample can be determined.

Gas chromatography is less likely to be used as an alcohol detection device since the equipment associated with this technique is generally expensive and can require large amounts of space compared to fuel cells and Taguchi cells. However, it is conceivable that a gas chromatography device could be installed on machine 19 for determining the sobriety of an operator.

Early alcohol detection devices, sometimes referred to as "breathalyzers," operated using the technique of chemical oxidation and photometry. A breath sample is bubbled through a vial containing a mixture of sulfuric acid, potassium dichromate, silver nitrate, and water. The reaction of alcohol in the breath sample with the mixture causes the mixture to change color. The degree of the color change is directly proportional to the amount of alcohol in the breath sample. A photocell system includes a second vial of unreacted mixture, and the color of the reacted mixture is compared to the color of the unreacted mixture. The photocell system generates an electric current based on the difference in colors, and the amount of alcohol in the breath sample is determined based on the current produced by the photocell system.

Referring still to FIG. 2 in the drawings, computing device 15 is preferably a microprocessor, but a person of skill in the art will appreciate that other devices capable of performing mathematical calculations and generating output signals may be employed. The computing device 15 is electrically connected to machine 19, alcohol detection device 13, and a memory device 35. Memory device 35 could be a separate data storage device as shown in FIG. 2, or memory device 35 could be incorporated into computing device 15. An electronic circuit 37 connecting computing device 15 to machine 19 cooperates with computing device 15 to control whether machine 19 is permitted to operate. Preferably, electronic circuit 37 is connected to a relay (not shown) at computing device 15 and to the main ignition circuit (not shown) at machine 19. When computing device 15 receives signals from alcohol detection device 13, the computing device 15 interprets those signals to determine whether the operator's blood alcohol concentration is equal to or above a predetermined level. If the blood alcohol level of the operator is determined to be at or above the predetermined level, the relay at computing device 15 remains in or moves to an open position, thereby preventing machine 19 from either starting or continuing to operate. If the blood alcohol level of the operator is determined to be below the predetermined level, the relay at computing device 15 moves to a closed position, thereby allowing the operator to start machine 19.

Computing device 15 is also electrically connected to an on-board diagnostic port 41 via electronic circuit 17. Port 41 is preferably a connection port on machine 19 for a second generation "on-board diagnostics" system, OBD-II, that provides diagnostic information and machine operating data for machine 19. OBD-II is a standard developed by the Society of Automotive Engineers, and all light vehicles sold in the United States after 1996 are required to have an OBD-II system and port to comply with requirements promulgated by the Environmental Protection Agency (EPA). The main purpose of the EPA requirement was to provide alerts to vehicle operators and diagnostic information to repair facilities about malfunctions in the vehicle's emission system.

In addition to the vehicle emission data made available through the OBD-II system, extensive machine operating data is available, some of which is relevant to the operation and purpose of a sobriety interlock device. As previously mentioned, existing sobriety interlock systems are limited in the amount of data that can be collected related to the operation of machine 19 since each individual item of data must typically be collected via an independent electronic circuit. This not only makes the installation process difficult, but also complicates the process of securing each individual electronic circuit against tampering by the operator. By connecting electronic circuit 17 to OBD-II port 41, a wealth of information can be obtained from a majority of automobiles over a consolidated electronic connection. Some of the data that can be collected from the OBD-II port 41 includes, without limitation, vehicle ignition, vehicle operating times, vehicle speed, engine revolutions per minute (RPMs), and vehicle mileage. The data collected from the OBD-II system is interpreted by software associated with computing device 15 and then stored either in real time or at discrete time intervals. Preferably, data will be stored by sobriety interlock device 11 in memory device 35. The storage of the machine operating data in conjunction with a time stamp and blood alcohol level data allows the data to be reviewed by authorities to insure that the operator of the machine is complying with rules and laws applicable to the machine's operation.

A person of ordinary skill in the art will also recognize that electronic circuit 17 could also be used to control the operation of machine 19 through on-board diagnostic port 41. Electronic circuit 17 would permit the engine on the machine to be stopped by interrupting operation of a fuel pump, an engine starter, or an ignition circuit. If the on-board diagnostic port 41 is used to provide control of the machine, electronic circuit 37 would no longer be necessary to control the operation of machine 19.

A sixteen-pin connector 45 (see FIG. 1) is preferably installed on the end of electronic circuit 17 to interface with OBD-II port 41. In a preferred embodiment, the sixteen-pin connector is configured in a "Y" configuration that provides a secondary connection port 47 for attaching diagnostic equipment to the OBD-II system. Secondary connection port 47 allows connector 45 to be permanently secured to OBD-II port 41, since removal of the connector 45 is not necessary to access the OBD-II system. Preferably, a tamper-proof wrapping (not shown) is installed around the connection of connector 45 and OBD-II port 41. The tamper-proof wrapping prevents unauthorized access to electronic circuit 17, which channels machine operating data to the sobriety interlock device 11.

Figure 2A:
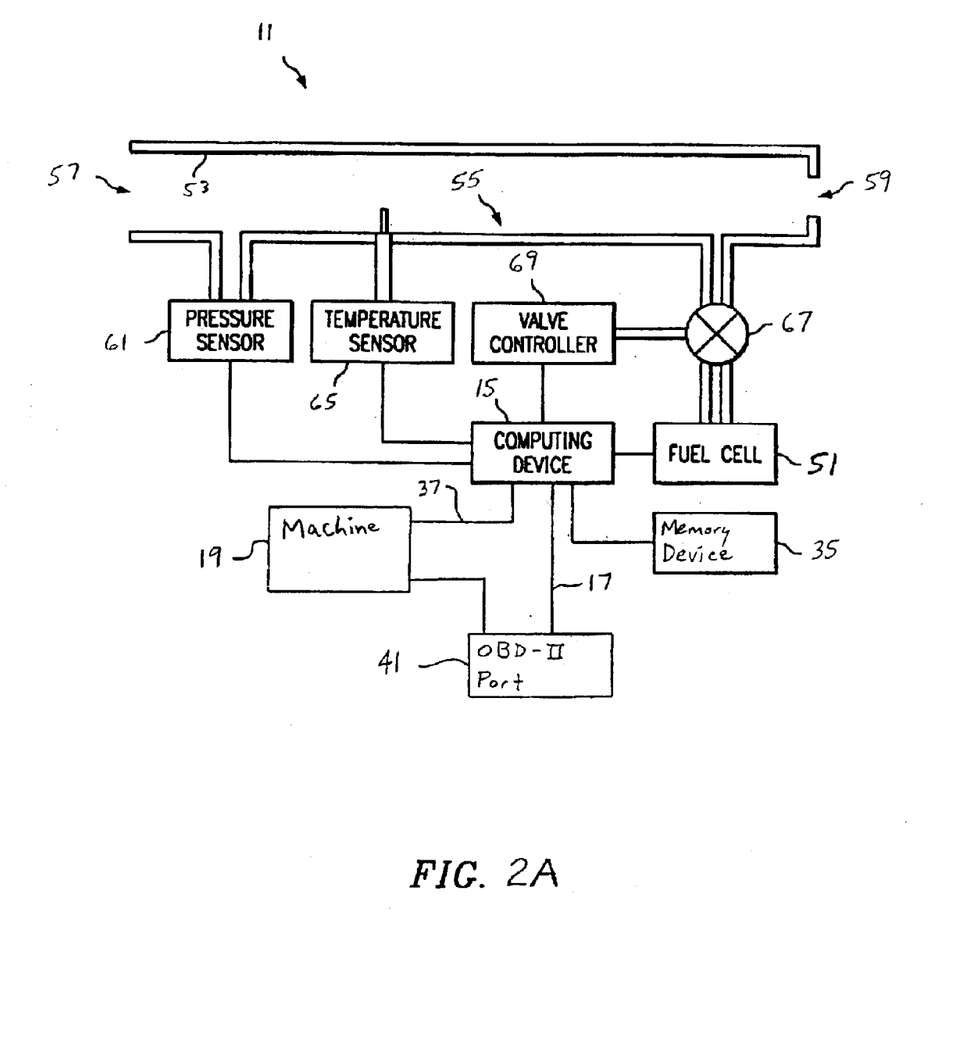
FIG. 2A illustrates a schematic view of one embodiment of the sobriety interlock system according to FIG. 1 having a fuel cell as an alcohol detection device.

FIG. 2A illustrates one particular embodiment of a sobriety interlock device 11 having a fuel cell 51 as an alcohol detection device. Fuel cell 51 is fluidly connected to a breath induction tube 53 for receiving a breath sample from an operator. Breath induction tube 53 encloses a breath flow channel 55 and includes an inlet 57 and an exit 59. A pressure sensor 61 is fluidly connected to the breath induction tube 53 for measuring the pressure in the breath flow channel 55. Preferably, pressure sensor 61 is of a resistance-bridge type. Pressure sensor 61 produces an electrical signal proportional to the pressure detected. That signal is input to computing device 15. A temperature sensor 65 is also fluidly connected to breath induction tube 53 to measure the temperature within breath flow channel 55. Temperature sensor 65, which is preferably of a thermistor type, is electrically connected to computing device 15.

Fuel cell 51 is also fluidly connected to the breath induction tube 53. A valve 67 is positioned between breath induction tube 53 and fuel cell 51. When closed, valve 67 prevents breath flow from reaching fuel cell 51, and instead causes the breath flow to flow through exit 59 of breath induction tube 53. When valve 67 is open, a portion of the breath flow passes through the valve into fuel cell 51, while the remainder of the breath flow exits breath induction tube 53 through exit 59.

Valve 67 can of any type suitable for low volume gas flow applications, but preferably is of a needle type with a tapered rubber tip. In the preferred embodiment, when the valve is closed, the tip of the valve 67 seats against a valve seat circumscribing an orifice of approximately 0.015 inches.

Operation of valve 67 is controlled by a valve controller 69. Valve controller 69 is capable of opening and closing valve 67 in response to signals from computing device 15. Preferably, valve controller 69 is a solenoid electrically connected to computing device 15.

In operation, an operator's breath is introduced into breath flow channel 55. The pressure within the breath flow channel 55 is measured using pressure sensor 61. Computing device 15 determines the flow rate of breath through the breath induction tube 53 based on the pressure within the breath flow channel 55. Then, the computing device 15 calculates the volume of breath that has passed through the breath induction tube 53 by numerically integrating the flow rate over time.

Preferably, valve 67 remains closed for a delay period sufficient for a predefined amount of breath to pass through the breath flow channel 34. Computing device 15 then transmits a valve open signal to the valve controller 69 to open valve 67 and permit a breath sample to flow into fuel cell 51. As previously described, fuel cell 51 produces an electrical signal proportional to the volume of alcohol present in the breath sample. This signal is input to the computing device 15, which determines the total volume of the breath sample based on the pressure and flow rate to the fuel cell. When the breath sample exceeds a predetermined amount, the computing device 15 transmits a valve close signal to the valve controller 69 to close the valve 67. Computing device 15 then calculates the alcohol concentration by dividing the fuel cell signal, representing the total amount of alcohol contained in the breath sample, by the known sample volume.

As previously described, a relay associated with computing device 15 remains open, thereby preventing operation of machine 19, if the blood alcohol level of the operator is equal to or above a predetermined amount. The relay is closed, allowing operation of the machine 19, if the blood alcohol level is below a predetermined amount.

Figure 3:
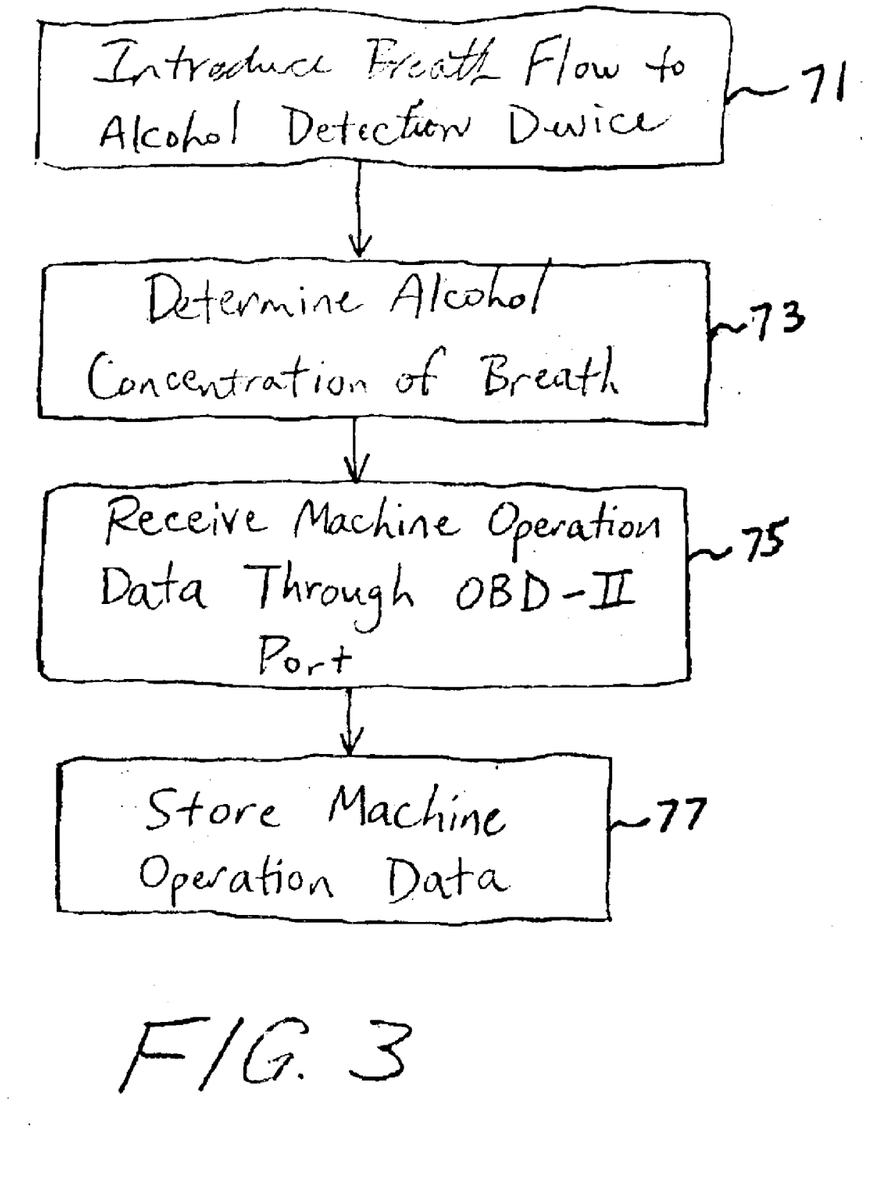
FIG. 3 depicts a schematic view of a method of gathering data related to the sobriety of an operator of a machine according to the present invention.

In operation, the sobriety interlock device 11 gathers data related to the operation of machine 19. Referring to FIG. 3 in the drawings, at step 71, a breath sample is introduced to alcohol detection device 13. Computing device 15 then determines the breath alcohol concentration of the breath sample at step 73. This information is typically logged in memory device 35 and is used to determine whether the computing device 15 will allow the machine 19 to start or continue operating. Machine operation data is received from OBD-II port 41 at step 75. As previously discussed, the machine operation data could include any data associated with the operation of the machine, such as data indicating whether and at what times the machine is operating, data indicating mileage over which the machine is operated, data indicating the speed of the machine at various points in time, and data indicating the RPMs of the machine at various points in time. The machine operation data is stored in memory device 35 for later access and review, as indicated by step 77.

Even though many of the examples discussed herein are applications of the sobriety interlock device using a traditional alcohol detection device, the interlock device could be configured to use any apparatus or technique that ultimately determines the blood alcohol content of an operator. In addition to the breath analysis devices described above, the alcohol detection device could conceivably test the blood, urine, or perspiration of the operator to determine the blood alcohol concentration.

A person having skill in the art will recognize that the sobriety interlock device could be configured for attachment to any standardized on-board diagnostic port on a machine for collecting and storing operating data about that machine. In the preferred embodiment, the interlock device is connected to an OBD-II port, which is commonly installed on automobiles and light trucks. The interlock device could be configured to work with previous generation systems, such as OBD-I, or standards that are developed in the future for reporting machine operating data. It should also be noted that the interlock device could be installed on heavy machinery and other transportation vessels including, without limitation, forklifts, backhoes, bull dozers, cranes, airplanes, trains, ocean liners, freighters, recreational water craft, motorcycles, and two-wheeled transportation devices such as the "Segway" manufactured by Segway LLC.

From the foregoing, it will be recognized that the sobriety interlock device of the present invention provides a superior system for preventing the operation of a machine by an intoxicated operator and for collecting data related to the machine's operation. By obtaining information through the existing OBD-II port on vehicles or machines, the interlock device can be easily installed, without the need to individually connect the device to separate sensors that measure machine operating data. Another advantage is provided since the consolidated electronic connection between the OBD-II port and the interlock device can be easily secured to prevent tampering. By wrapping the electronic circuit connecting the OBD-II port and the interlock device, operators are prevented from altering data being logged by the interlock device, and attempts to tamper with the electronic circuit are made apparent by damage that is inflicted to the wrapping material.

It should be apparent from the foregoing that an invention having significant advantages has been provided. While the invention is shown in only a few of its forms, it is not just limited but is susceptible to various changes and modifications without departing from the spirit thereof.

We claim:

1. A sobriety interlock for a machine comprising:
   an alcohol detection device;
   a computing device electrically connected to the alcohol detection device, the computing device capable of determining a blood alcohol concentration of an operator based on a signal received from the alcohol detection device, and capable of controlling the operation of the machine based on the blood alcohol concentration; and
   an electronic circuit capable of connecting the computing device to an on-board diagnostic port on the machine, wherein the diagnostic port is capable of providing the computing device secure power and data and an independent interface to external diagnostic equipment.

2. A sobriety interlock according to claim 1, wherein the on-board diagnostic port is an OBD-II port.

3. A sobriety interlock according to claim 1, wherein the alcohol detection device measures a breath sample provided by the operator to determine the breath alcohol concentration.

4. A sobriety interlock according to claim 3, wherein the alcohol detection device further comprises a fuel cell electrically connected to the computing device.

5. A sobriety interlock according to claim 3, wherein the alcohol detection device further comprises a Taguchi cell electrically connected to the computing device.

6. A sobriety interlock according to claim 3, wherein the alcohol scopy technique to detect the breath alcohol concentration detection device uses an infrared spectroscopy technique to detect the breath alcohol concentration.

7. A sobriety interlock according to claim 3, wherein the alcohol detection device uses a gas chromatography technique to detect the breath alcohol concentration.

8. A sobriety interlock according to claim 3, wherein the alcohol detection device uses a chemical oxidation and photometry technique to detect the breath alcohol concentration.

9. A sobriety interlock according to claim 1, wherein:
   the electronic circuit is capable of transmitting machine operating data to the computing device from the machine; and
   the computing device includes a memory device capable of storing the machine operating data.

10. A sobriety interlock for a machine comprising:
    an alcohol detection device capable of detecting alcohol in a sample human breath provided by an operator and capable of generating a signal proportional to a breath alcohol concentration of the breath sample;
    a computing device electrically connected to the alcohol detection device, the computing device capable of calculating a blood alcohol concentration of the operator based on the breath alcohol concentration;

a first electronic circuit electrically connected to the computing device, the electronic circuit capable of controlling operation of the machine based on the blood alcohol concentration determined by the computing device; and a second electronic circuit capable of connecting the computing device to an on-board diagnostic port on the machine, the on-board diagnostic port providing tamper—resistant power and data to the computing device and independently providing an interface for interfacing with external diagnostic equipment.

11. A sobriety interlock according to claim 10, wherein the on-board diagnostic port is an OBD-II port.

12. A sobriety interlock according to claim 10, wherein the alcohol detection device further comprises a fuel cell electrically connected to the computing device.

13. A sobriety interlock according to claim 10, wherein the alcohol detection device further comprises a Taguchi cell electrically connected to the computing device.

14. A sobriety interlock according to claim 10, wherein the alcohol detection device uses an infrared spectroscopy technique to detect the breath alcohol concentration.

15. A sobriety interlock according to claim 10, wherein the alcohol detection device uses a gas chromatography technique to detect the breath alcohol concentration.

16. A sobriety interlock according to claim 10, wherein the alcohol detection device uses a chemical oxidation and photometry technique to detect the breath alcohol concentration.

17. A sobriety interlock according to claim 10, wherein the alcohol detection device further comprises:

a gas induction tube for channeling a flow of the breath sample, the gas induction tube defining a gas flow channel;

a pressure sensor connected to the gas induction tube, the pressure sensor capable of generating an electrical pressure signal in response to the pressure in the gas flow channel;

a fuel cell fluidly connected to the gas induction tube, the fuel cell capable of producing an alcohol volume signal proportional to the breath alcohol concentration of the breath sample;

a valve disposed between the gas induction tube and the fuel cell, the valve being initially set in an operating condition that is capable of preventing flow between the gas flow channel and the fuel cell;

wherein the computing device is electrically connected to the pressure sensor and to the fuel cell, the computing device being capable of generating an electrical valve open signal; and a valve controller connected to the valve and to the computing device, the valve controller capable of opening the valve in response to the electrical valve open signal.

18. A method of gathering data related to the sobriety of an operator of a machine, the method comprising the steps of:

sampling the breath of the operator with an alcohol detection electrically connected to a computing device;

determining the alcohol concentration of the breath with an on-board computing device;

receiving machine operation data through an on-board diagnostic port on the machine, the diagnostic port providing an independent interface to diagnostic equipment;

providing secure power to the on-board computing device from the diagnostic port; and storing the machine operation data.

19. A method of gathering data according to claim 18, wherein the on-board diagnostic port is an OBD-II port.

20. A method of gathering data according to claim 18, wherein the steps of receiving and storing machine operation data further comprise:

receiving and storing data indicating whether the machine is on;

receiving and storing data indicating mileage for the machine; and receiving and storing data indicating the speed of the machine.

21. A method of gathering data according to claim 18, wherein the machine operation data and the breath alcohol concentration are repeatedly collected at discrete time intervals.

22. A method of gathering data according to claim 18, wherein the machine operation data is continuously collected in real time.

* * * * *